US006157819A

United States Patent [19]

Vuokko et al.

[11] Patent Number: 6,157,819

[45] Date of Patent: *Dec. 5, 2000

[54] COUPLING ELEMENT FOR REALIZING ELECTROMAGNETIC COUPLING AND APPARATUS FOR COUPLING A RADIO TELEPHONE TO AN EXTERNAL ANTENNA

[75] Inventors: Kai Vuokko, Tampere; Petteri Annamaa, Oulu, both of Finland

[73] Assignee: LK-Products Oy, Kempele, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/856,277

[22] Filed: May 14, 1997

[30] Foreign Application Priority Data

May 14, 1996 [FI] Finland .................................... 962051

[51] Int. Cl.7 ................................ H04B 1/38; H01Q 1/24

[52] U.S. Cl. ............................ 455/90; 455/575; 343/702

[58] Field of Search .................................... 455/575, 550, 455/90, 128; 343/702, 814; 361/816

[56] References Cited

U.S. PATENT DOCUMENTS

| | | | |
|---|---|---|---|
| 4,193,076 | 3/1980 | Ito et al. | 343/702 |
| 4,220,955 | 9/1980 | Frye . | |
| 5,173,711 | 12/1992 | Takeuchi et al. | 343/700 MS |
| 5,184,143 | 2/1993 | Marko | 343/749 |
| 5,220,335 | 6/1993 | Huang | 343/700 MS |
| 5,357,262 | 10/1994 | Blaese . | |
| 5,394,162 | 2/1995 | Korovesis et al. | 343/703 |
| 5,532,703 | 7/1996 | Stephens et al. | 343/702 |
| 5,557,287 | 9/1996 | Potta et al. | 343/702 |
| 5,557,290 | 9/1996 | Watanabe | 343/702 |
| 5,619,213 | 4/1997 | Hays, III | 343/703 |
| 5,668,561 | 9/1997 | Perrotta et al. | 343/702 |
| 5,673,053 | 9/1997 | Marthinsson | 343/728 |
| 5,684,492 | 11/1997 | Kagoshima et al. | 343/700 MS |
| 5,711,014 | 1/1998 | Crowley et al. | 455/575 |
| 5,739,790 | 4/1998 | Green, Jr. | 343/702 |
| 5,777,585 | 7/1998 | Tsuda et al. | 343/702 |
| 5,886,668 | 3/1999 | Pedersen et al. | 343/702 |

FOREIGN PATENT DOCUMENTS

| | | | |
|---|---|---|---|
| 05243830 | 9/1993 | European Pat. Off. | H01Q 1/24 |
| 08279712 | 10/1996 | European Pat. Off. | H01Q 1/24 |
| 2 266 997 | 11/1993 | United Kingdom | H01Q 1/32 |
| 2 296 406 | 6/1996 | United Kingdom | H01Q 1/24 |
| WO 95/07556 | 3/1995 | WIPO | H01Q 1/32 |

*Primary Examiner*—Nguyen Vo
*Assistant Examiner*—Charles N. Appiah
*Attorney, Agent, or Firm*—Darby & Darby

[57] ABSTRACT

The antenna (D) of a radio telephone radiates electromagnetic RF radiation which is directed to a dielectric body block (10) according to the invention. By means of an inner and an outer conductor (1, 2) formed on the surface of the block a signal carried by the electromagnetic radiation is coupled to a coaxial cable (12) which takes it to an external antenna.

13 Claims, 2 Drawing Sheets

COUPLING ELEMENT FOR REALIZING ELECTROMAGNETIC COUPLING AND APPARATUS FOR COUPLING A RADIO TELEPHONE TO AN EXTERNAL ANTENNA

BACKGROUND OF THE INVENTION

This invention relates to a coupling element for realizing an electromagnetic coupling and to an apparatus for coupling a radio communication device, advantageously a cellular mobile phone, to an external antenna. The invention can be advantageously applied for coupling a mobile phone to a car antenna.

A common way of improving the car use characteristics of a mobile phone is to install outside the body of the car a so-called car antenna to which the mobile phone is connected via a coaxial conductor and a RF connector at the end of the conductor. Therefore, a prior art mobile phone must include a counterpart for said RF connector. Then the antenna of the mobile phone must be made inoperative either by an automatic switch connected to said counterpart for the RF connector or by the user with a separate switch, lest simultaneous operation of the both antennas cause interference and losses.

Said RF connector and its counterpart may constitute a standard coaxial interface based on galvanic contact, but such a solution is susceptible to oxidization, dirt and wear. A solution is known from Finnish Patent No. 84536 and corresponding EPO application EP-0 399 975, wherein the RF coupling between the mobile phone and the connector part in the car installation set is made capacitively by means of metal plate counterparts. This arrangement avoids said oxidization, dirt and wear problems, but it does not eliminate the need for a separate switch to disconnect the mobile phone antenna for the duration of car use. In addition, the switching means and the transmission lines connected to the means require space inside the mobile phone.

There also exist prior art methods and devices for electromagnetically coupling a car antenna to a mobile phone antenna. The simplest electromagnetic coupler is an induction loop placed around the mobile phone antenna. Patent document GB-2 266 997 discloses a solution according to FIG. 1 of this application, wherein a connector part B comprising a resonator element C is attached with adhesive tape or the like to the casing of a mobile phone A to be used in a car. By attaching the connector part B to the mobile phone A said resonator element C is brought so close to the mobile phone antenna D that it is electromagnetically coupled to the antenna and starts to resonate, whereby RF power radiated by the mobile phone antenna is coupled to it and that power is further taken via a coaxial conductor E to the car antenna. A disadvantage of this arrangement is that the coupling between the mobile phone antenna D and the resonator element C depends on their positions relative to each other. An external resonator element also puts an electric load on the mobile phone antenna, thereby decreasing its resonating frequency and weakening the coupling in the upper part of the frequency band used.

SUMMARY OF THE INVENTION

An object of this invention is to provide an apparatus for coupling a radio communication device, advantageously a cellular mobile phone, to an external antenna, partly avoiding and partly reducing the aforementioned disadvantages related to prior art solutions. Another object of this invention is to provide an apparatus with which a radio communication device can be coupled to an external antenna without a separate antenna switch. Yet another object of the invention is to provide an apparatus for realizing said coupling with small losses. Naturally, an object of the invention is that the solution according to the invention can be applied in large-scale series production and is durable and easy to use.

This is achieved by placing near the antenna of the radio communication device a coupling element made of a material with a high dielectric constant and comprising electrically conductive portions, the positioning and geometry of the coupling element being such that a significant part of the energy radiated by the antenna of the radio communication device is directed to the coupling element and via it to a feed cable for an external antenna.

The invention also relates to an apparatus with which a radio communication device, advantageously a cellular mobile phone, can be coupled to an external antenna. The apparatus according to the invention is characterized in that it comprises at least one coupling element described above.

The invention is based on the idea that a dielectric coupling element can be used to direct the radio power radiated by the antenna of a radio communication device in a manner such that it is coupled with small losses to the feed cable of a desired external antenna. The quality of the electromagnetic coupling between the antenna and the coupling element near it is affected especially by the coupling element matchings and its load effect on the antenna as well as by the minimization of radiation losses. The electromagnetic energy is coupled from the antenna to the dielectric element through reactive fields. A material with a high dielectric constant is known to attract a lot of electromagnetic energy, so it can be used to control the field of a particular electromagnetic radiator. Such materials include the ceramic substances used as body materials for modern dielectric resonators and filters consisting of those resonators.

Each antenna type used in mobile stations, for example, has a radiation field the shape of which can be either calculated or measured. We also know the physical laws according to which propagating electromagnetic wave motion is bent at the interface between two media having different dielectric constants. Furthermore, we know that a dielectric resonator structure usually has a certain principal axis in the direction of which a propagating electromagnetic field experiences the least attenuation and is best coupled to the signal ports of the dielectic resonator structure. According to the invention, a dielectric coupling element is placed near the antenna of a radio communication device in a manner such that the electromagnetic waves radiated by the antenna propagate into the dielectric element via a certain interface at which they are refracted such that they propagate in the dielectric material in an optimal manner. The electrical length of the coupling element may be e.g. half or a quarter of the wavelength of the carrier of the radio communication device. The coupling element has a signal port through which a signal carried by the electromagnetic field is taken via a coaxial cable to an external antenna. Similarly, the signal received by the external antenna is taken via the coaxial cable and the signal port to the coupling element wherefrom it is taken by means of the electromagnetic field to the antenna of the radio communication device.

BRIEF DESCRIPTION OF THE DRAWINGS

The invention is described in more detail with reference to the preferred embodiments, presented for the sake of illustration, and to the accompanying drawings wherein.

DESCRIPTION OF ILLUSTRATING EMBODIMENTS

Figure 1:
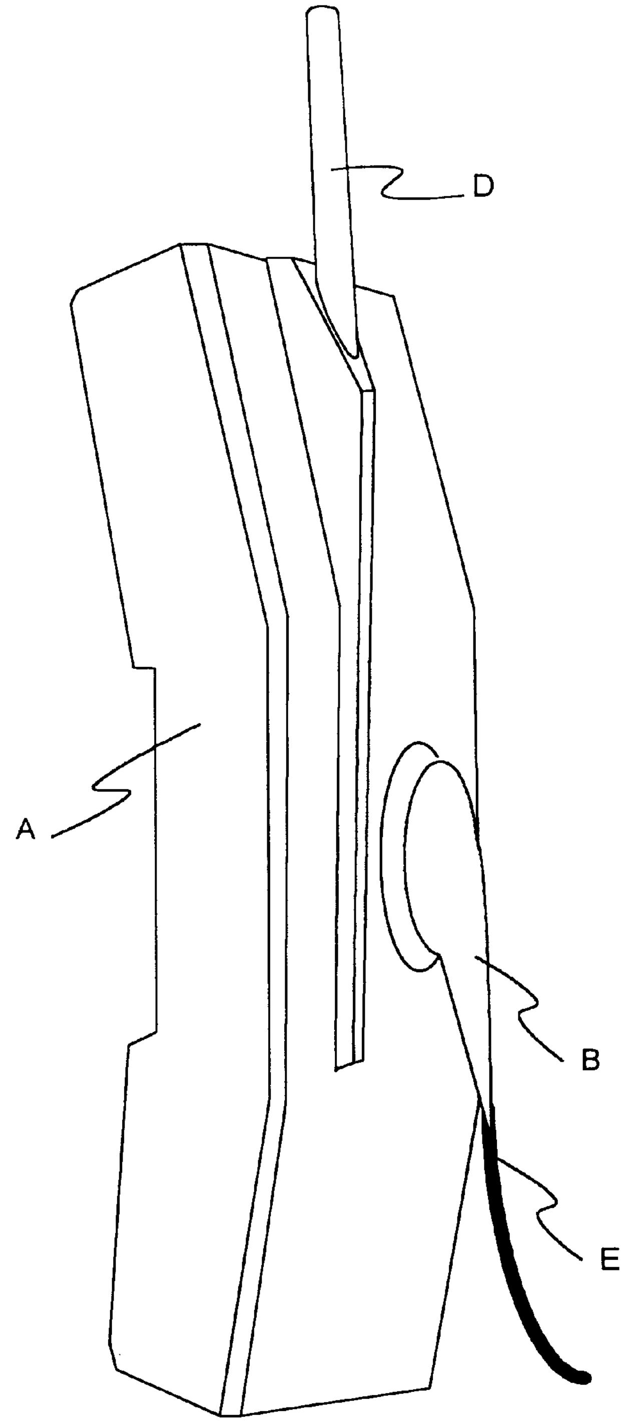
Fig. 1 PRIOR ART
FIG. 1 shows an arrangement according to the prior art to connect a mobile phone to an external antenna.
Figure 1A:
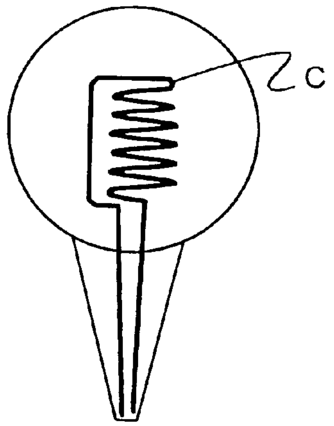
Fig. 1A PRIOR ART

Above, in conjunction with the description of the prior art, reference was made to FIG. 1, so below, in the description of the invention and its preferred embodiments, reference will be made mainly to FIGS. 2 to 4. Like elements in the drawings are denoted by like reference designators.

Figure 2:
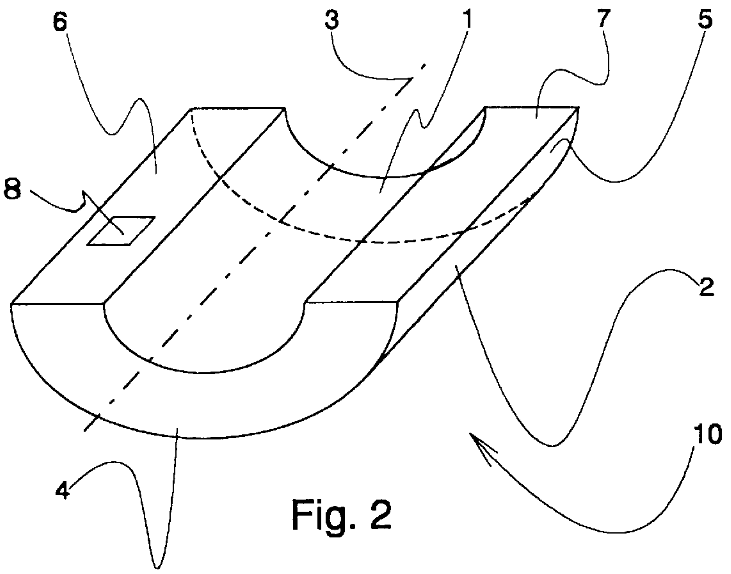
FIG. 2 shows a preferred embodiment of the coupling element according to the invention.

FIG. 2 is a schematic illustration of a piece 10 in the shape of a cylinder segment having an inner surface 1 in the shape of a cylinder part and an outer surface 2 in the shape of a cylinder part concentric with the aforementioned cylinder part but having a longer radius. The drawing also shows the imaginary longitudinal axis 3 of the circular cylinders that include surfaces 1 and 2. The cylinder segment determined by the inner and outer surfaces is bounded by a first end surface 4 and a second end surface 5 perpendicular to the axis 3. In addition, the piece is bounded by plane surfaces 6 and 7 parallel to the axis 3 and intersecting all the above-mentioned surfaces.

According to the invention, the piece shown in FIG. 2 is made of a material having a high dielectric constant, advantageously $\epsilon_r=36$ or $\epsilon_r=82$ or a corresponding value in that order of magnitude. Suitable materials include zircon tin titanate and barium neodymium titanate which are commonly used as materials for body blocks of so-called ceramic filters. Ceramic filters are radio frequency filters used in mobile phones, for example. The inner surface I and outer surface 2 are made electrically conductive e.g. by treating them with a metal-bearing coating material, said material and its use being known to one skilled in the art as they are applied in the manufacture of the above-mentioned ceramic filters. The inner surface 1 thus constitutes an inner conductor and the outer surface 2 constitutes an outer conductor. The structure constitutes a dielectric resonator the electrical length of which in the direction of the axis 3 is half of the wavelength of the resonating frequency as the end surfaces 4 and 5 are electrically non-conductive. Furthermore, if the inner surface 1 and outer surface 2 are short-circuited by forming on the second end surface 5 an electrically conductive coating which is in galvanic contact with the coatings of both the inner surface 1 and outer surface 2, the electrical length of the structure in the direction of the axis 3 will be a quarter of the wavelength of the resonating frequency. Signal port I*b*(FIG. 3), which serves as an output port for the transmitted signal and as an input port for the received signal, is part of the inner conductor 1 or it can be a separate coupling pad (not shown) on an otherwise uncoated surface.

The electromagnetic field can penetrate into the piece shown in FIG. 2 through open end surfaces 4 and 5 or if end surface 5 is coated, through the open end surface 4. It is said that the electromagnetic field is coupled to the coupling element shown in FIG. 2 through the open end surface 4 (and/or 5 if surface 5 is open). The open end surface 4 and the space between it and the primary antenna D can also be called a coupling hole 4*b*. If necessary, it is possible to form on plane surfaces 6 and 7 electrically conductive coupling patterns, or so-called parasitic elements 8, the principle of which is known from ceramic filter technology and which affect, among other things, the coupling bandwidth, i.e. the width of the frequency band on which the electromagnetic field is coupled to the coupling element according to the invention without significant coupling losses.

The matching between the antenna and the coupling element generally refers to the equality of the electromagnetic coupling between them. It is said that the antenna is in tune on a particular frequency band. The design of the coupling element and possible parasitic elements are chosen such that when the coupling element is brought in the vicinity of the antenna, the coupling element is in tune essentially on the same frequency band as the antenna. Then, the coupling loss between the antenna and the coupling element on the frequency band in question is small, advantageously about −1 to −3 decibels. The tuning-in of a dielectric coupling element on a desired frequency band e.g. by changing its design and/or parasitic elements is a technique known to a person skilled in the art.

Figure 3:
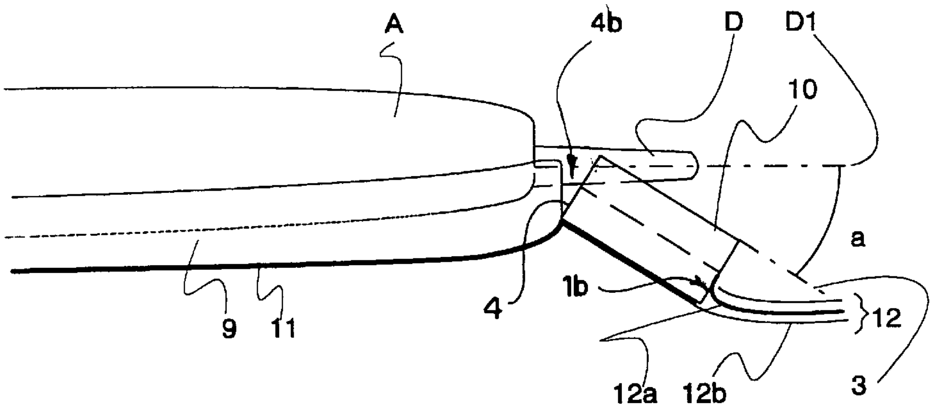
FIG. 3 illustrates the use of the embodiment shown in FIG. 2 in an apparatus for connecting a mobile phone to an external antenna.
Figure 4:
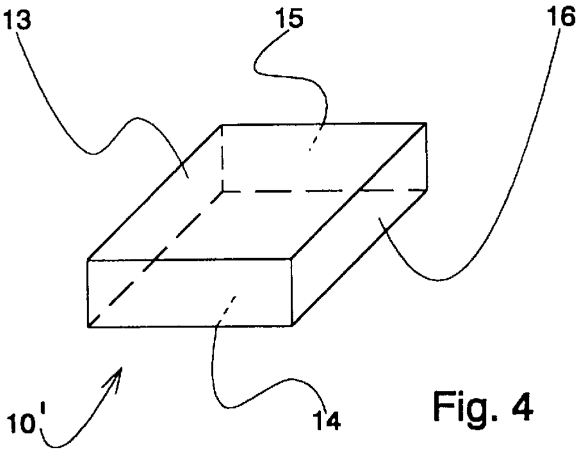
FIG. 4 shows another preferred embodiment of the coupling element according to the invention.

FIG. 3 shows an apparatus for coupling a mobile phone to an external antenna, the apparatus including a coupling element according to FIG. 2. The drawing shows in schematic format a mobile phone A and its antenna D. The coupling element 10 according to the invention is attached to the body 9 which advantageously comprises means for mechanically fastening the mobile phone into it for the duration of a ride, for example. The body 9 is advantageously made of plastic and there is connected to it a ground plane 11 which can be a metal plate or an electrically conductive coating section, for example, and which in the embodiment illustrated is located on the bottom surface of the body 9. The ground plane intensifies coupling to the body currents occurring in the mobile phone and prevents the occurrence of radiation losses in the direction of the ground plane as seen from the antenna D. The apparatus also includes a coaxial cable 12 which comprises an inner conductor 12*a* and an outer conductor 12*b*. The inner conductor 12*a* is connected to inner conductor 1 of the coupling element 10 and the outer conductor 12*b* is connected to the outer conductor 2 of the coupling element 10. These connections and the cross section of the cable between them serve as a signal port. At the other end of the coaxial cable 12 there is an external antenna, such as a car antenna (not shown).

In the embodiment illustrated in FIG. 3, the location of the coupling element 10, relative to the mobile phone antenna D, is such that the longitudinal axes D1 of the antenna and the longitudinal axis 3 of the coupling element are on one and the same plane (in FIG. 3, on the plane parallel to the paper surface) but there is between them an angle a. The purpose of this is that the electromagnetic field radiated by the antenna D is coupled to the coupling element 10 through the open end surface 4 and, upon passing the surface, it is refracted such that, having penetrated into the dielectric body material, it propagates in it in an optimal manner. In the embodiment shown, angle a is about 40 degrees and it has been chosen empirically by measuring the power fed to the mobile phone antenna D and the power coupled to the coaxial cable 12, calculating the coupling loss between them and changing angle a such that the least coupling loss is achieved. Since different antenna types have different electromagnetic field directions and shapes at a distance of a few millimeters from the antenna, the right value for angle a should be determined separately for each antenna type. The angle value also depends on the dielectric constant of the body material of the coupling element 10 because the greater the difference between the dielectric constants of two materials, the more an electromagnetic wave bends at their interface. Furthermore, the value of angle a depends on the amount and shape of conductive patterns formed on the surface of the coupling element. Determining the optimum position for the coupling element empirically is a technique known to a person skilled in the art and requires no special inventive action.

As the coupling element is attached to the body 9 and the mobile phone A is attached to the body always in the same way, the position of the coupling element 10 relative to the mobile phone antenna D is always the same when the user places the mobile phone in the body for the duration of a ride, for example.

In the embodiment of FIG. 3, the inner conductor 12*a* of the coaxial cable is coupled to the inner conductor 1 of the coupling element at the second end 5 of the element, and the first end 4 of the element points towards the mobile phone antenna. This positioning requires that both end surfaces 4,5 of the element be uncoated, i.e. the element be dimensioned according to half the wavelength. Instead of the manner shown in the drawing, the inner conductor 12*a* of the coaxial cable could also be coupled to the inner conductor 1 of the coupling element at the first end of the coupling element. A quarter-wavelength coupling element having its one end short-circuited, or coated such that it electrically connects inner conductor 1 and outer conductor 2, is positioned in the apparatus according to the invention such that its open end points towards the mobile phone antenna, but then the inner conductor 12*a* of the coaxial cable must be coupled to the inner conductor 1 of the coupling element at its open end.

The cylindrical shape of the coupling element presented above as an example does not restrict the invention to only certain shapes of coupling elements. FIG. 4 shows another possible coupling element shape. Here the coupling element 10 is shaped as a rectangular prism which has, referring to the positioning in the drawing, an upper surface 13, a lower surface 14, two end surfaces 15 and two side surfaces 16. The names of the surfaces serve illustrative purposes only and do not restrict the positioning of the piece. The upper and lower surfaces constitute a coated conductor pair in the same way as the inner surface 1 and outer surface 2 in the embodiment in FIG. 2. The end surfaces 15 are both uncoated, in which case the electrical length of the coupling element is half the wavelength, or one of them is coated, in which case the electrical length of the coupling element is a quarter of the wavelength. Parasitic elements may be formed on the side surfaces 16 in the same way as described above, referring to FIG. 2.

It is obvious to a person skilled in the art that the dielectric body block of the coupling element can be shaped in many ways. Obvious variations to the illustrative embodiments described above are e.g. different bevellings and groove shapes on the surfaces confining the body block in order to control the electromagnetic field in the body block. The apparatus according to the invention may also comprise more coupling elements arranged on different sides of the antenna of the mobile phone attached to the rack, in which case it is possible to further decrease the coupling losses caused by stray radiation.

According to measurements, the dielectric coupling element according to the invention causes a smaller coupling loss than prior art solutions. In addition, it has a very simple construction and includes no fragile parts or parts susceptible to wear or dirt. The apparatus according to the invention for coupling a radio communication device to an external antenna requires no special fastening arrangements or awkward threading movements to attach or unattach a mobile phone, so it is extremely easy to use. The invention is well applicable to large-scale series production and its manufacturing costs are reasonable. The invention is not limited to use only in conjunction with a mobile phone or a car antenna, but can be applied to any object where one wishes to couple a radio communication device having an antenna of its own to an external auxiliary antenna.

What is claimed is:

1. A coupling element for transferring an electromagnetic field between an element radiating at a radio frequency and a particular signal port forming the end of a cable, comprising a dielectric body block and in connection with said dielectric body block, a coupling hole arranged to intercept an electromagnetic field and to direct said electromagnetic field into said dielectric body block, an outer conductor to provide an electric ground plane for guiding said electromagnetic field through said body block, and an inner conductor connected galvanically to a conductor of said cable to guide said electromagnetic field through said dielectric body block to said signal port.

2. The coupling element of claim 1, wherein said dielectric body block is elongated in the direction of a certain longitudinal axis and is confined by a first end surface and a second end surface in the direction perpendicular to said longitudinal axis, whereby said coupling hole is the same as said first end surface.

3. The coupling element of claim 2, wherein said outer conductor is an electrically conductive material layer on a certain third surface of said body block, the third surface being substantially perpendicular to said first and second end surfaces, and said inner conductor is an electrically conductive material layer on a certain fourth surface of said body block, the fourth surface being substantially perpendicular to said first and second end surfaces.

4. The coupling element of claim 3, wherein said second end surface is electrically open.

5. The coupling element of claim 3, wherein said second end surface is electrically conductive to provide a short circuit between said inner conductor and said outer conductor.

6. The coupling element of any one of the preceding claims, wherein said dielectric body block is further confined by a fifth and a sixth surface which intersect said first and second and surfaces and said third and fourth surfaces.

7. The coupling element of claim 6, wherein said coupling element includes on at least one of said fifth and sixth surfaces at least one electrically conductive parasitic element in order to affect the electrical characteristics of said coupling element.

8. The coupling element of claim 3, wherein said third surface is a plane surface and said fourth surface is a plane surface.

9. The coupling element of any one of claims 3 to 7, wherein said third surface is part of a first cylinder surface, the longitudinal symmetry axis of which coincides with said longitudinal axis, and said fourth surface is part of a second cylinder surface, the longitudinal symmetry axis of which coincides with said longitudinal axis.

10. An apparatus for connecting a radio telephone having a first antenna, to an external antenna, comprising:

a cable for feeding an external antenna;

a coupling element between the first antenna and said feed cable, comprising a dielectric body block, a coupling hole to feed an electromagnetic field from the first antenna to said dielectric buy block, an outer conductor on the outer surface of said dielectric body block to provide an electric ground plane for guiding said electromagnetic field through said dielectric body block, and an inner conductor on the opposite surface of said dielectric body block to guide said electromagnetic field through said dielectric body block to said field cable; and means for detachably contacting said radio telephone to said apparatus.

11. The apparatus of claim 10, wherein said feed cable is a coaxial cable comprising a skin conductor and a middle conductor, wherein said middle conductor is connected to said inner conductor of the coupling element, and said skin conductor is connected to said outer conductor of the coupling element.

12. The apparatus of claim 10, wherein the longitudinal axis of the coupling element is substantially on the same plane with the longitudinal axis of the first antenna and forms a certain predetermined angle with the longitudinal axis of the first antenna, said predetermined angle being selected such that the longitudinal axis of the coupling element and the longitudinal axis of the first antenna are non-parallel.

13. The apparatus of claim 12, wherein said predetermined angle is substantially 40 degrees.

* * * * *